us007912995B1

(12) United States Patent
Long et al.

(10) Patent No.: US 7,912,995 B1
(45) Date of Patent: Mar. 22, 2011

(54) MANAGING SAS TOPOLOGY

(75) Inventors: Matthew Long, Uxbridge, MA (US);
Morrie Gasser, Hopkinton, MA (US);
Brian Parry, Holden, MA (US)

(73) Assignee: EMC Corporation, Hopkinton, MA (US)

( * ) Notice: Subject to any disclaimer, the term of this patent is extended or adjusted under 35 U.S.C. 154(b) by 129 days.

(21) Appl. No.: 12/004,167

(22) Filed: Dec. 20, 2007

(51) Int. Cl.
*G06F 13/10* (2006.01)

(52) U.S. Cl. ............................................ 710/18; 710/17

(58) Field of Classification Search ..................... 710/62
See application file for complete search history.

(56) References Cited

U.S. PATENT DOCUMENTS

| 7,292,597 | B2 * | 11/2007 | Mills et al. ..................... 370/433 |
| 7,317,691 | B2 * | 1/2008 | Mills et al. ..................... 370/252 |
| 7,317,732 | B2 * | 1/2008 | Mills et al. ..................... 370/445 |
| 7,327,754 | B2 * | 2/2008 | Mills et al. ..................... 370/463 |
| 7,536,584 | B2 * | 5/2009 | Davies et al. ..................... 714/5 |
| 7,584,319 | B1 * | 9/2009 | Liao et al. ..................... 710/317 |
| 7,685,329 | B1 * | 3/2010 | Sivertsen ..................... 710/15 |
| 7,822,908 | B2 * | 10/2010 | Stenfort ..................... 710/315 |
| 7,826,349 | B2 * | 11/2010 | Kaur et al. ..................... 370/229 |
| 2007/0294572 | A1 * | 12/2007 | Kalwitz et al. ..................... 714/9 |
| 2008/0056424 | A1 * | 3/2008 | Chang et al. ..................... 375/371 |

* cited by examiner

*Primary Examiner* — Cheng-Yuan Tseng
(74) *Attorney, Agent, or Firm* — Krishnendu Gupta; Jason A. Reyes; Phillip W. Citroen

(57) ABSTRACT

SAS topology is managed. Internally within a SAS device on a SAS network, a performance characteristic of a PHY of the SAS device is monitored. Internally within the SAS device, it is determined, based on the performance characteristic, that the PHY has a problem, and, based on the determination, the PHY is affected to help prevent the PHY from adversely affecting communications on the SAS network.

11 Claims, 5 Drawing Sheets

MANAGING SAS TOPOLOGY

INCORPORATION BY REFERENCE

This patent application incorporates by reference the entire subject matter in copending U.S. patent application Ser. No. 11/238,601 filed Sep. 29, 2005 entitled RAID DATA STORAGE SYSTEM WITH SAS EXPANSION, assigned to the same assignee as the present invention.

TECHNICAL FIELD

This invention relates to managing SAS topology.

BACKGROUND

As is known in the art, it is sometimes desirable that the data storage capacity of the data storage system be expandable. More particularly, a customer may initially require a particular data storage capacity. As the customer's business expands, it would be desirable to correspondingly expand the data storage capacity of the purchased storage system.

Small Computer Systems Interface ("SCSI") is a set of American National Standards Institute ("ANSI") standard electronic interface specification that allow, for example, computers to communicate with peripheral hardware.

SCSI interface transports and commands are used to interconnect networks of storage devices with processing devices. For example, serial SCSI transport media and protocols such as Serial Attached SCSI ("SAS") and Serial Advanced Technology Attachment ("SATA") may be used in such networks. These applications are often referred to as storage networks. Those skilled in the art are familiar with SAS and SATA standards as well as other SCSI related specifications and standards. Information about such interfaces and commands is generally obtainable at the website http://www.t10.org. As used herein, reference to SAS devices and protocols may be understood to include SATA devices and protocols.

Such SCSI storage networks are often used in large storage systems having a plurality of disk drives to store data for organizations and/or businesses. The network architecture allows storage devices to be physically dispersed in an enterprise while continuing to directly support SCSI commands. This architecture allows for distribution of the storage components in an enterprise without the need for added overhead in converting storage requests from SCSI commands into other network commands and then back into lower level SCSI storage related commands.

A SAS network typically comprises one or more SAS initiators coupled to one or more SAS targets often via one or more SAS expanders. In general, as is common in all SCSI communications, SAS initiators initiate communications with SAS targets. The expanders expand the number of ports of a SAS network domain used to interconnect SAS initiators and SAS targets (collectively referred to as SAS devices or SAS device controllers).

In general, a SAS initiator directs information to a SAS target device through ports of one or more SAS expanders in the SAS domain. A "port" in SAS terminology is a logical concept. A port may comprise one or more physical links in a SAS domain. Such physical links are often referred to as PHYs in the terminology of SAS domains. A port may use a single PHY or, if the port is configured as a wide port, may use multiple PHYs logically grouped to provide higher bandwidth. Each PHY can support one SAS lane or channel.

In the SAS standard, a logical layer of protocols includes the PHY. Each PHY is configured for passing data between the SAS device and another device coupled thereto. As used herein, "physical layer", "PHY" or "PHY layer" all refer to a protocol layer that uses a physical transmission medium used for electronic communication including, but not limited to, the PHY layer as specified in the SAS standards.

When a SAS domain starts up, one or more initiator devices perform a "Discovery" process in accordance with the SAS specifications so that each SAS component may generate information indicative of the SAS domain topology. In other words, the SAS Discovery process specified by the SAS specifications permits each SAS device and each SAS expander in the domain to discover information about immediate neighbors coupled to its ports as well as information about other devices and expanders coupled to ports of neighboring components. Thus, each SAS device and SAS expander in a SAS domain may acquire information regarding the overall geometry or topology of the SAS domain.

When a change occurs in the SAS domain, a SAS expander as presently known in the art has only a limited role in adapting devices in the SAS domain to reconfigure for the sensed change. In particular, if a SAS expander senses a change in the SAS domain, as presently known in the art, the SAS expander may issue a BROADCAST(CHANGE) primitive to broadcast to all SAS initiators the fact that some change has occurred. The SAS expander does not inform the SAS initiators what change has been detected. Rather, a SAS initiator that receives the BROADCAST primitive on the SAS communication medium will perform the SAS Discovery process anew. The SAS Discovery process re-discovers all configuration and topological information regarding devices in the SAS domain-whether changed or not changed. Performing a complete SAS Discovery process to detect any change in a SAS domain, even a small change, consumes valuable resources in the SAS initiator and valuable bandwidth in the SAS domain communication paths.

SUMMARY

SAS topology is managed. Internally within a SAS device on a SAS network, a performance characteristic of a PHY of the SAS device is monitored. Internally within the SAS device, it is determined, based on the performance characteristic, that the PHY has a problem, and, based on the determination, the PHY is affected to help prevent the PHY from adversely affecting communications on the SAS network.

One or more embodiments of the invention may provide one or more of the following advantages.

The effects of flaky devices or interconnects between devices on a SAS topology can be reduced or eliminated.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

As described below, a technique is provided for use in managing SAS topology. In at least one implementation, as described below, the technique may be used to help provide a self healing SAS topology in the event of faults that could be caused by either bad SAS expanders or bad or missing SAS cables, whether detected as a side effect or by failure status.

For example, in at least one case of storage subsystems that use SAS and SATA devices to store their data, these devices are connected to the storage controller through SAS expanders. Conventionally, since the SAS topology defines a mechanism for broadcasting changes within the topology, and a change to the topology occurs whenever a physical interface changes state ("PHY state change"), a flaky device, interconnect, or transceiver potentially can cause an excessive amount of broadcast messages and other activity related to discovery or rediscovery of the topology. (In at least some implementations, a flaky PHY is meant to be a PHY that stays at least partially operable and/or alternates between being inoperable and being fully operable, but in general works so poorly that little useful data gets through. Such a flaky PHY could cause one or more of the following problems: (1) it continues to accept traffic, but little of that traffic gets through without errors, causing a significant performance loss due to retransmissions; (2) its operability problems cause difficulties as described herein relating to broadcasts that provoke excessive discoveries.) In at least one conventional system, this is very disruptive to the overall topology and greatly affects performance, including the performance of other devices. In addition, conventionally the SAS standard allows multiple PHYs to be used when interconnecting devices, and in these cases it is also possible for one or more of the PHYs to have a flaky connection thus causing excessive errors and retries, which can also adversely affect performance.

In at least some implementations, the technique provided herein for use in managing SAS topology helps reduce the effects of flaky devices or interconnects between devices on the overall SAS topology. A procedure is executed, e.g., on or in an expander, that detects when too many PHY state changes or too many errors have occurred. Once a threshold is exceeded, the offending PHY is disabled thus helping to restore the remainder of the topology to a healthy state.

Figure 1:
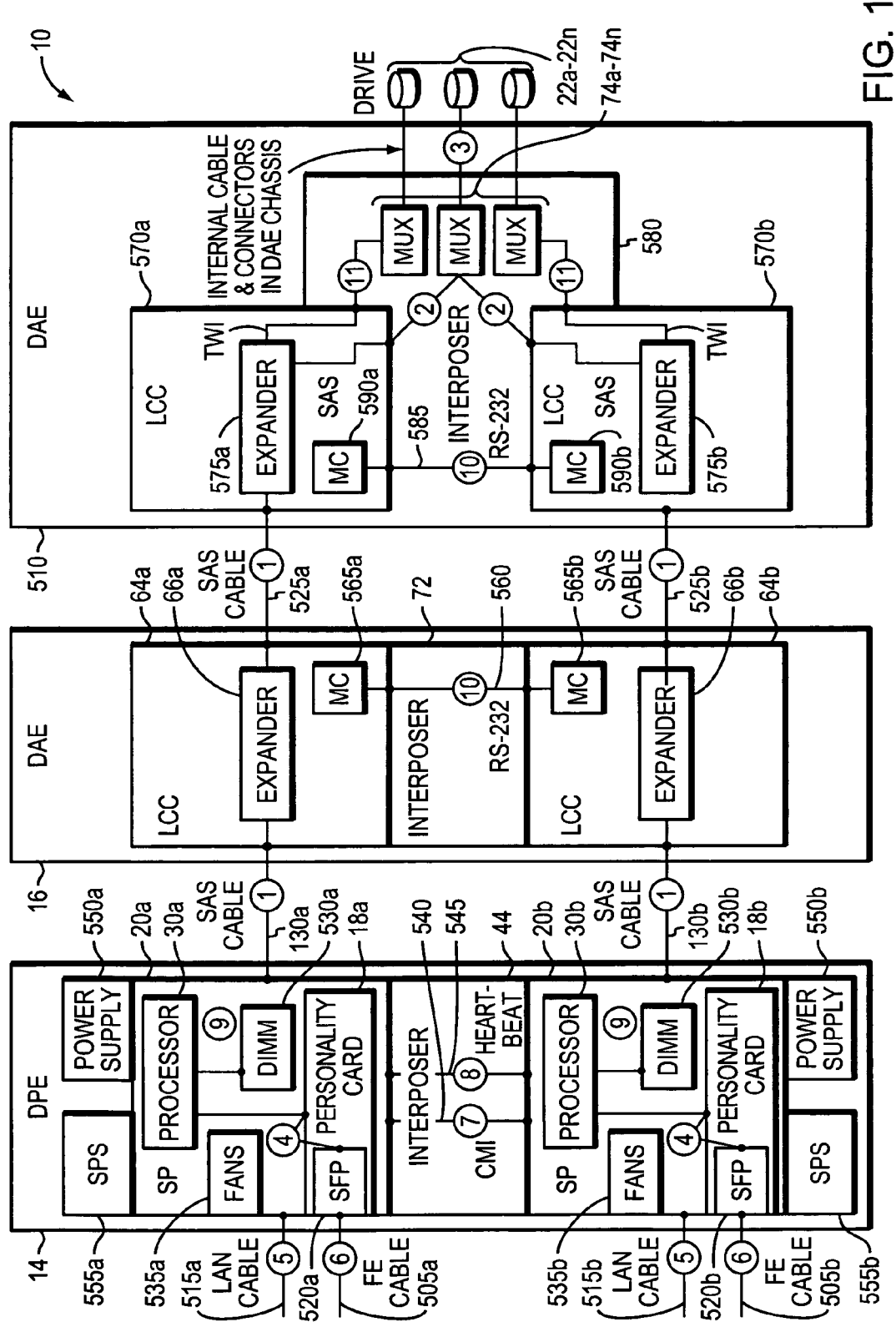
FIG. 1 is a block diagram of a data storage system.

Referring now to FIG. 1, for example, the technique may be used in or with a sample data storage system 10. System 10 is coupled by a pair of front end (FE) cables 505a, 505b to respective pair of host computer/servers (not shown). System 10 is also coupled by a pair of local area network (LAN) cables 515a, 515b to the respective pair of host computer/servers. The data storage system 10 includes a plurality of, here for example, at least three chassis or enclosures 14, 16, 510 as shown. Enclosure 14 is sometimes referred to herein as a Disk Processor Enclosure (DPE) and each of enclosures 16, 510 is sometimes referred to herein as a Disk Array Enclosure (DAE). DPE 14 includes a pair of front end controllers (also known as personality cards) 18a, 18b having respective Small Form-factor Pluggable (SFP) ports 520a, 520b coupled to the pair of host computer/servers. The DPE 14 also includes a pair of storage processors (SPs) 20a, 20b coupled to each other with storage processor 20a being connected to front end controller 18a and storage processor 20b being connected to front end controller 18b, as shown.

The storage processors 20a, 20b of DPE 14 are connected to the DAE 16 through a pair of SAS cables 130a, 130b, respectively, as shown, and through DAE 16 to DAE 510 through a pair of SAS cables 525a, 525b, respectively, as shown. The DAE 510 includes disk drives 22a-22n.

The DPE 14 is shown to include the pair of storage processors 20a, 20b, each disposed on a corresponding one of a pair of printed circuit boards. Each one of the printed circuit boards has disposed thereon: a processor 30a or 30b, DIMM memory 530a or 530b, and fans 535a or 535b.

The DPE 14 also includes an interposer printed circuit board 44 interconnecting the storage processors with a CMI signal 540 and a heartbeat signal 545, and a pair of power supplies 550a, 550b, and a pair of standby power supplies (SPSs) 555a, 555b.

DAE 16 is shown to include a pair of SAS expander printed circuit boards (also known as link controller cards or LCCs) 64a, 64b, and a pair of SAS expanders 66a, 66b, each one being disposed on a corresponding one of the pair of SAS expander printed circuit boards 64a, 64b.

Also included in DAE 16 is an interposer printed circuit board 72 bearing an RS232 signal 560 between LCCs 64a, 64b. DAE 16 includes a pair of management controllers 565a, 565b, each one being disposed on a corresponding one of the pair of expander printed circuit boards.

DAE 510 is shown to include a pair of LCCs 570a, 570b, and a pair of SAS expanders 575a, 575b, each one being disposed on a corresponding one of the pair of LCCs 570a, 570b.

Also included in DAE 510 is an interposer printed circuit board 580 bearing an RS232 signal 585 between LCCs 570a, 570b. DAE 510 includes a pair of management controllers 590a, 590b, each one being disposed on a corresponding one of the pair of LCCs 570a, 570b.

A plurality of multiplexers 74a-74n is disposed on the interposer printed circuit board 72, each one of the plurality of multiplexers 74a-74n being connected to SAS expander 575a and to SAS expander 575b. The DAE 510 includes, as noted above, the plurality of disk drives 22a-22n, each one being coupled to one of the plurality of multiplexers 74a-74n.

In at least one implementation, DPE 14 may have up to 12 disk drives, and each one the DAEs 16, 510 may have up to 12 disk drives each, and two more DAEs having up to 12 disk drives each may be added in a chain from DAE 510, to provide data storage system 10 with up to 60 disk drives. The connections between enclosures use standard SAS signals and cables.

Figure 2:
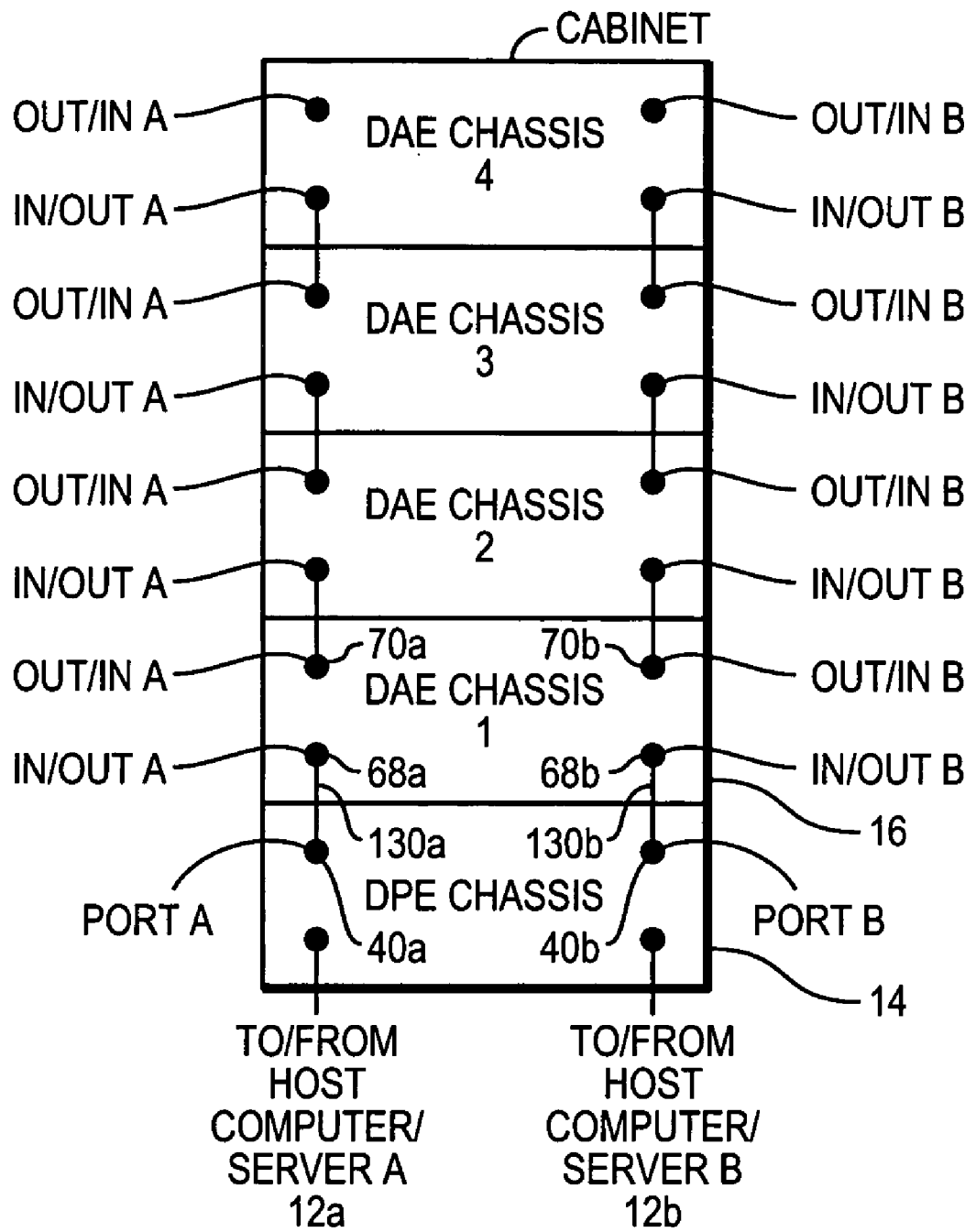
FIGS. 2-3 are block diagrams of features that may be present in the data storage system of FIG. 1.

Data storage system 10 (FIG. 1) may be further expanded as shown in FIG. 2 in a cabinet here having four DAEs including DAE 16 (DAE chassis 1), DAE 510 (DAE chassis 2) and DPE 12 (DPE chassis 0). As noted above, here a DPE has up to 12 disk drives, and each one of the four DAEs has 12 disk drives to provide, in this example, a data storage system having up to 60 disk drives. Enclosures can be wired up in any of multiple ways, one of which is shown in FIG. 2 for use with hosts 12a, 12b. The connections between enclosures consist of standard SAS signals and cables.

Each one of the cables includes four SAS lanes so that at any one instant in time, at most 4 messages can be going to 4 different drives, but successive messages can be sent to different drives using the same SAS lane. Those 4 lanes are also used to send traffic to drives on downstream expanders, so a message can be sent on one of the input lanes, out one of the 4 output lanes to an input lane on the next box.

Here, in the DPE there are four lanes at each of the expansion ports 40a, 40b. For each DAE there are four SAS lanes between each one of the ports 70a, 70b and the connected one of the pair of SAS expanders 64a, 64b, respectively, and one SAS lane between each multiplexer and a backend SAS port.

Figure 3:
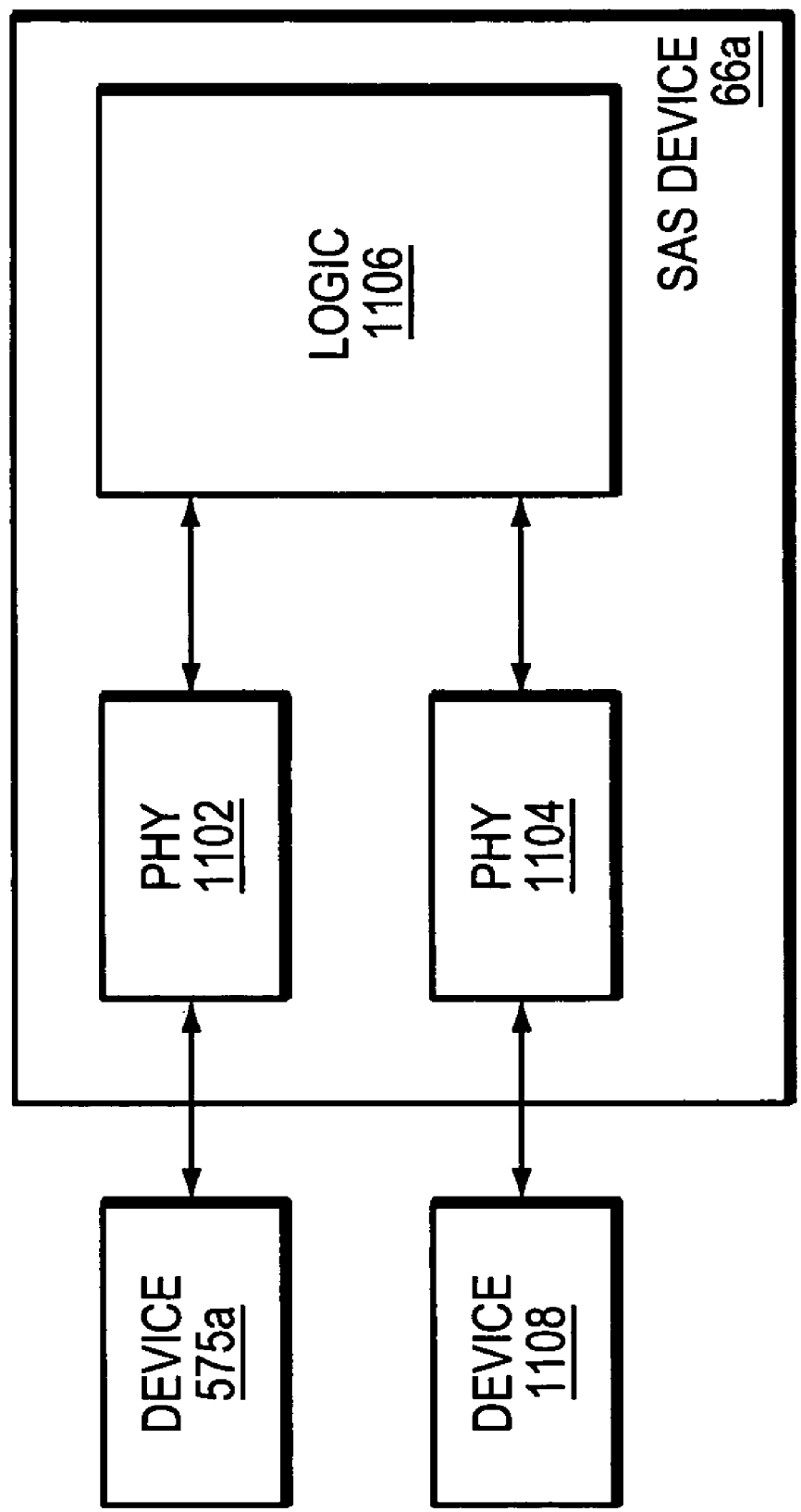

FIG. 3 illustrates an example arrangement of logic within and connected to a SAS expander or device such as expander 66a, wherein expander 66a has logic 1106 and PHYs 1102, 1104, and uses PHYs 1102, 1104 to communicate with other SAS devices 575a, 1108 (which may be respectively downstream and upstream in the system, for example).

Described below is a first example approach to the technique for use in managing SAS topology, particularly for use with a wide port, but at least potentially for use with a drive port, which may have a problem such as a flaky PHY. For example, this approach may be executed within device 66a by logic 1106 with respect to one or more of PHYs 1102, 1104.

In this approach, PHYs are monitored to detect bad PHYs, i.e., PHYs that may become unexpectedly unready, or that may have errors exceeding preset thresholds per unit time, and such bad PHYs are disabled to help prevent them from causing difficulties. With respect to "unexpectedly unready", under normal conditions, the PHY should be ready, if the cable is plugged in (or, in the case of a drive port, the insert bit is set).

Figure 4:
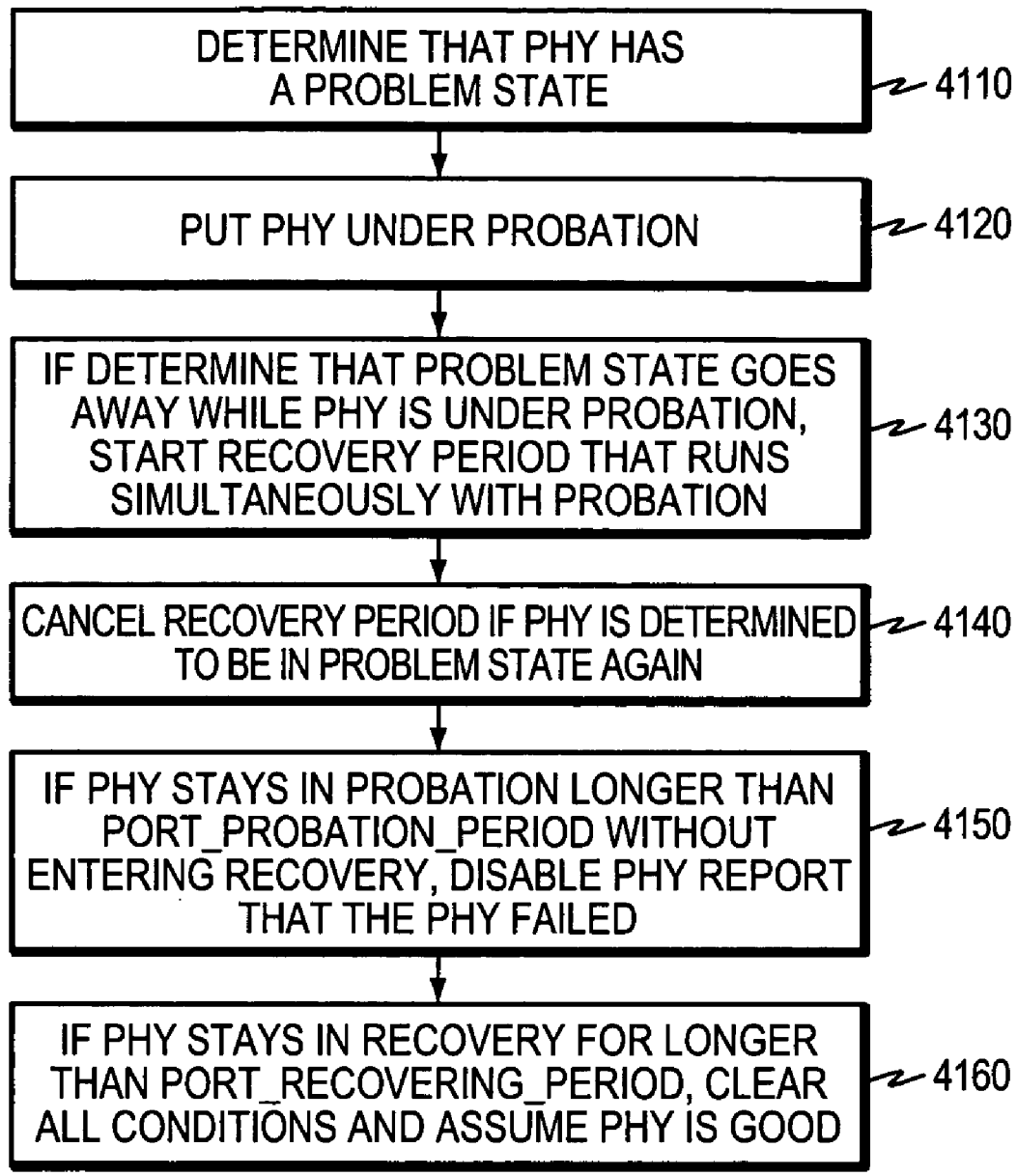
FIGS. 4-5 are flow diagrams of procedures that may be used with the storage system of FIG. 1.

With reference to FIG. 4, the first time a PHY is determined to have a problem state (step 4110) as described below, the PHY is put under probation (step 4120). If the problem state is determined to go away while the PHY is under probation, a recovery period for recovery is started that runs simultaneously with probation (step 4130). The recovery period is cancelled if the PHY is determined to be in a problem state again (step 4140). If the PHY stays in probation longer than a PORT_PROBATION_PERIOD time without entering recovery, the PHY is disabled and it is reported that the PHY failed (step 4150). If the PHY stays in recovery for longer than a PORT_RECOVERING_PERIOD time, all conditions are cleared and it is assumed that the PHY is good (step 4160).

In at least some implementations, PHYs that have been disabled are re-enabled when the cable is disconnected (or, in the case of a drive port, when the drive is removed).

In an example implementation, PORT_PROBATION_PERIOD is set to 5 seconds and PORT_RECOVERING_PERIOD is set to 2 seconds. These settings can be adjusted depending on the type of PHY (e.g., for cable or drive, or for wide port or drive port). The example implementation also has the following other characteristics as used herein. "Enabled" and "disabled" refers to an expander-controlled state of the PHY, i.e., whether it is turned on or off. "Reserved" and "unreserved" refers to the state of a PHY controlled by the expander, indicating whether the PHY is being used by a diagnostic procedure (e.g., a loopback test). "Ready" and "unready" refers to the status of the PHY as observed by an expander.

In the example implementation, a PHY is determined to be in a problem state in either of the following circumstances, and only in the case of a transient state of an enabled, unreserved PHY, which transient state is tested and then reset every poll cycle:

1. A PHY is not ready when it should be ready. "Should be ready" refers to a case in which either a PHY is in a wide port that has ready unreserved PHYs, or a PHY is associated with a drive port and the corresponding insert bit is set.

2. A PHY exceeds an error threshold: PHY is ready and disparity error count or code violation count exceeds ERROR_INTL_THHD in any given PMON_PERIOD, which parameters can be adjusted depending on type of PHY (e.g., for wide port or drive).

In the example implementation, a disabled or reserved PHY may never be determined to be in a problem state.

"Port", in the case of a drive PHY, corresponds to the PHY, and in the case of a wide port PHY, corresponds to all the PHYs in the wide port. "Degraded" refers to a state of a port in which at least one PHY in the port is in a problem state. "Probation" refers to a state of a port; each time this state is set, a probation timer starts. "Recovery" refers to a state of a port; it can be concurrent with probation, and each time this state is set, a recovery timer starts.

In the example implementation, the first example approach to the technique proceeds as follows. A check is made for any one of the following conditions on every poll cycle:

1. The ready status of a PHY changed.
2. A PHY has failed or passed an explicitly run internal or external loopback test
3. The enabled state of a PHY changed.
4. A port is degraded
5. A port is under probation
6. A PHY transitioned from reserved to unreserved.
7. The insert bit on a drive PHY is reset (in the case of a drive port)

If any of above is true, the following procedure is executed for the PHY's port.

1. If the port is a wide port and none of the PHYs are ready, or if the port is a drive port and the insert bit is reset, all the PHYs of the port are enabled and probation and recovery states are reset.
2. If the port is degraded and the port was not previously degraded, a probation state is set for the port.
3. If the port is in probation but is not degraded, a recovery state is set.
4. If the port is in recovery state and is degraded, recovery state is cancelled.
5. If the port is not in recovery and probation timer exceeds PORT_PROBATION_PERIOD, the PHYs in the port with problems are disabled.
6. If the port is in recovery and recovery timer exceeds PORT_RECOVERING_PERIOD, the probation and recovery states are cleared.

Described below is a second example approach to the technique for use in managing SAS topology. For example, this approach may be executed within device 66a by logic 1106 with respect to one or more of PHYs 1102, 1104. In at least some cases, it is useful for the implementation to be primitive, predictable, and independent of higher level code, and to take care of the case in which leaving the PHY enabled is detrimental to devices other than the device attached to the PHY in question. In at least one implementation, issues with the device attached to the PHY in question can be handled by other procedures, e.g., existing procedures within the system's operating system so that the device can be marked dead and the system can cease sending I/O to the device.

In at least some cases a PHY can cause problems accessing other devices, particularly as a result of PHY state changes. Every time the PHY state changes, a broadcast is issued and a discovery is required. If this is happening frequently, it affects performance, fills logs, and in general make the system unhealthy. A way to detect when a PHY has caused a condition that triggered a broadcast is to look at its change count.

Figure 5:
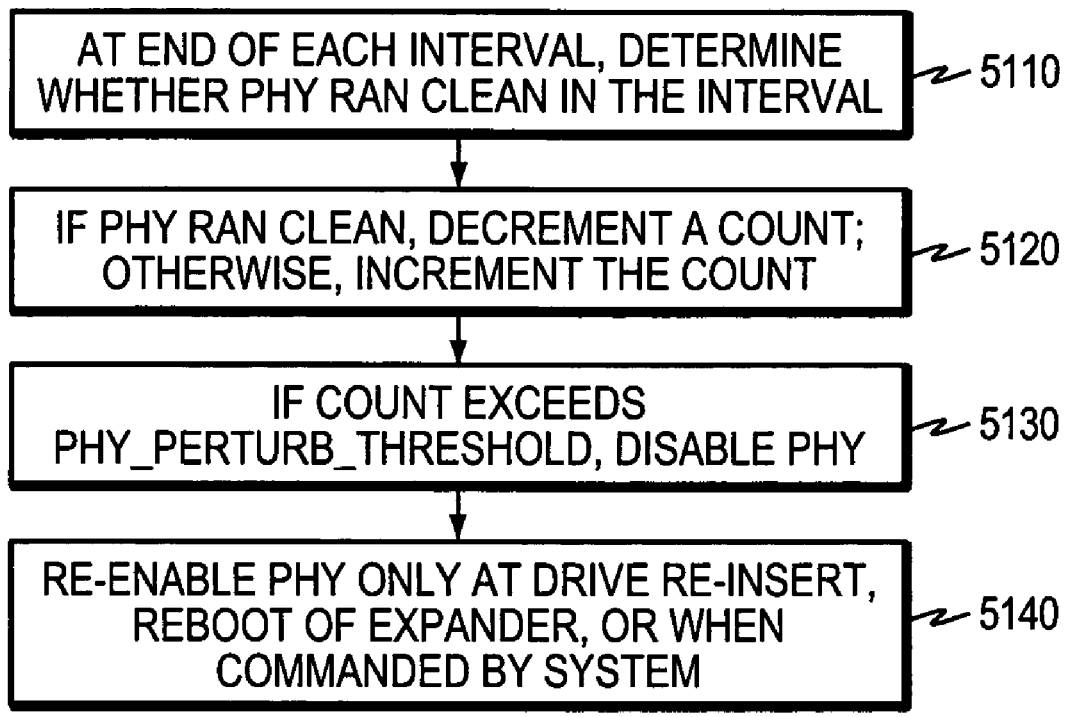

The following pseudocode illustrates a sample embodiment of a procedure in accordance with the second example approach to the technique for use in managing SAS topology. With reference to FIG. 5, the procedure may be summarized as follows. Each second it is determined whether the PHY ran clean in the last second (step 5110), "clean" meaning without one or more events that cause perturbation of the topology (e.g., a BROADCAST(CHANGE) event). If the PHY ran clean, a count is decremented; otherwise, the count is incremented (step 5120). If the count exceeds a PHY_PERTURB_THRESHOLD threshold, the PHY is disabled (step 5130). The PHY is only re-enabled at drive re-insert (and/or at drive removal), reboot of the expander or when commanded by the system, e.g., the operating system (step 5140).

```
RunAtExpanderinitTime( )
{
for phy in phys
    phy.ReEnable( )
}
RunWhenDriveInserted(phy)
{
phy.ReEnable( )
}
When CommandedToEnableByHost(phy)
{
phy.ReEnable( )
}
When CommandedToDisableByHost(phy)
{
DisablePhy(phy.phyNumber)// Disable the physical phy
}
// Minimum number of perturbed sample to mark phy bad.
#define MIN_TIME_TO_THRESHOLD 10
// Number of clean samples required for each perturbed
sample in order to
// continue to run. In other words, it takes this many clean
samples for
// every bad sample to keep the phy up, otherwise the phy
will be disabled.
#define CLEAN_TO_DIRTY_RATIO 100
#define PHY_PERTURB_THRESHOLD (MIN_TIME_
TO_THRESHOLD * CLEAN_TO_DIRTY_RATIO)
```

```
RunOncePerSecond( )
{
  for phy in phys
  {
    if (phy.Enabled)
    {
      if (phy.lastChangeCount != GetPhyChangeCount(phy.phyNumber))
      {
        phy.lastChangeCount = GetPhyChangeCount(phy.phyNumber);
        if (phy.perturbCount >= PHY_PERTURB_THRESHOLD)
          DisablePhy(phy.phyNumber) // Disable the physical phy
          phy.perturbCount = PHY_PERTURB_THRESHOLD;
        else
          phy.perturbCount += CLEAN_TO_DIRTY_RATIO;
      else if (phy.perturbCount >0)
      { // Phy ran clean this last second so reduce the perturb count
        phy.perturbCount--;
      }
    }
  }
}
phy.ReEnable( )
{
  // Clear the phy's perturb count before re-enabling the phy.
  self.perturbCount = 0;
  EnablePhy(self.PhyNumber) // Enable the physical phy
}
```

A number of embodiments of the invention have been described. Nevertheless, it will be understood that various modifications may be made without departing from the spirit and scope of the invention. Accordingly, other embodiments are within the scope of the following claims.

What is claimed is:

1. A method for use in managing SAS (Serial Attached SCSI) topology, comprising:
internally within at least one SAS device on a SAS network, monitoring a performance characteristic of a PHY of the SAS device, wherein the SAS device is connected to a storage controller within a data storage system through at least one SAS expander, wherein the data storage system comprises at least two chassis or enclosures connected through a pair of SAS cables, the chassis or enclosures having the SAS expander;
internally within the SAS device, determining, based on the performance characteristic, that the PHY is in a problem state;
internally within the SAS device, putting the PHY under probation by initiating a probation timer based on the determination affecting the PHY to help prevent the PHY from adversely affecting communications between the chassis or enclosures on the SAS network;
based on the probation timer, if the PHY stays in probation longer than a specified time interval without entering recovery, disabling the PHY;
internally within the SAS device, entering recovery by initiating a recovery timer if it is determined that the problem has gone away after initiating the probation timer;
based on the recovery timer, cancelling the recovery timer if the PHY is determined to return to the problem state; and
internally within the SAS device, terminating the probation timer and the recovery timer if the recovery timer exceeds a specified time interval, wherein terminating the probation timer and the recovery timer means that the PHY is assumed to be good.

2. The method of claim 1, further comprising:
once a threshold is exceeded, disabling the PHY.

3. The method of claim 1, further comprising:
detecting that the PHY became unexpectedly unready.

4. The method of claim 1, further comprising:
detecting that the PHY has errors exceeding a preset threshold per unit time.

5. The method of claim 1, further comprising:
determining that a PHY is in a problem state if the PHY is not ready when it should be ready.

6. The method of claim 5, wherein the PHY is expected to be ready if the PHY is in a wide port that has ready unreserved PHYs.

7. The method of claim 5, wherein the PHY is expected to be ready if the PHY is associated with a drive port and a corresponding insert bit is set.

8. The method of claim 1, further comprising:
determining that a PHY is in a problem state if the PHY exceeds an error threshold.

9. The method of claim 1, further comprising:
based on whether the PHY ran clean in a specified interval, affecting a count.

10. The method of claim 1, further comprising:
based on whether the PHY ran clean in a specified interval, disabling the PHY.

11. The method of claim 1, further comprising:
reenabling the PHY after a change to a drive's insertion status.

* * * * *